United States Patent [19]

Brown

[11] Patent Number: 5,486,294

[45] Date of Patent: Jan. 23, 1996

[54] METHOD OF INHIBITING BARIUM SULFATE AND STRONTIUM SULFATE SCALE AT LOW PH

[75] Inventor: J. Michael Brown, The Woodlands, Tex.

[73] Assignee: Betz Laboratories, Inc., Trevose, Pa.

[21] Appl. No.: 316,611

[22] Filed: Sep. 30, 1994

[51] Int. Cl.$^6$ .................................................... C02F 5/10
[52] U.S. Cl. .......................... 210/674; 210/698; 210/700
[58] Field of Search ........................... 210/674, 698–701, 210/190; 252/180

[56] References Cited

U.S. PATENT DOCUMENTS

| | | | |
|---|---|---|---|
| 4,287,072 | 9/1981 | Beecher | 210/696 |
| 4,664,811 | 5/1987 | Operhofer | 210/674 |
| 5,062,962 | 11/1991 | Brown et al. | 210/698 |
| 5,112,496 | 5/1992 | Dhawan et al. | 210/700 |
| 5,147,555 | 9/1992 | Brown et al. | 210/698 |
| 5,248,438 | 9/1993 | Perez | 210/698 |
| 5,368,740 | 11/1994 | Zidovec et al. | 210/698 |

*Primary Examiner*—Peter A. Hruskoci
*Attorney, Agent, or Firm*—Alexander D. Ricci; Steven D. Boyd

[57] ABSTRACT

Disclosed is a method of inhibiting the formation of scales such as barium and strontium sulfate in low pH aqueous system. The method involves treating the aqueous system with a scale control treatment including polyepoxysuccinic acid. Typical low pH aqueous systems where the present invention is particularly useful are oilfield produced water, resin bed water softeners during acid regeneration operations.

4 Claims, No Drawings

METHOD OF INHIBITING BARIUM SULFATE AND STRONTIUM SULFATE SCALE AT LOW PH

FIELD OF THE INVENTION

The present invention relates to the inhibition of scale formation in low pH aqueous systems. More particularly, the present invention relates to the use of polyepoxysuccinic acid to inhibit barium sulfate and strontium sulfate scale in low pH aqueous systems such as occur in the acidic regeneration of resin in a water softening system.

BACKGROUND OF THE INVENTION

In the production of hydrocarbons from subterranean reservoirs, water is typically produced in combination with the hydrocarbons. Hydrocarbon recovery operations separate the water from the hydrocarbons. The resulting produced water is typically processed for use or discharge. The produced water often contains soluble inorganic salts such as calcium, barium, strontium, magnesium, etc. The hardnesses such as calcium, barium, strontium, magnesium, etc. can be removed in a softener system to allow use of the water such as in a steam generation system. In such water softening systems when the softener resin is depleted, it is regenerated with acid. This aqueous acid stream is susceptible to the formation of barium sulfate and strontium sulfate scales due to the $SO_4^-$ ion in the dilute acidic stream. The sulfate ion may be present in acid dilution water sources. These sulfate scales, in addition to fouling the resin, have been linked to naturally occurring radioactive materials which are present in low levels in the produced waters. These radioactive materials can become concentrated to dangerous levels when co-precipitated with the barium and strontium sulfates.

In an acid regeneration operation, acid is injected into the upstream pipelines feeding a resin bed. The acid flows through the resin bed and the downstream vessels and pipelines. At the leading edge of the acid "plug" the pH increases due to dilution of the acid with water present in the system. It is in this increased, but still acidic zone that scale precipitation can be a problem.

Organic phosphonates are employed for controlling barium sulfate and strontium sulfate scales in many aqueous systems. However, at the low pH of the aqueous streams in resin regeneration operations organic phosphonates have been found to be ineffective. It is believed the ineffectiveness is due to protonation of the phosphonic acid molecule.

The effectiveness of phosphonates is typically limited to pH's above about 4 or 5. Thus, if the pH drops below about 4 the scale control activity of phosphonates diminishes and precipitation of barium sulfate and strontium sulfate can occur. The precipitation of barium sulfate and strontium sulfate is also pH dependent. At pH's below about 1 the scales do not precipitate. It is in the pH range of from about 1 to 4 that scale precipitation can occur even in the presence of phosphonate control agents. This pH range can be created at the interface zone between the acid regenerant and the produced water. In this interface zone neither phosphonates nor acid are effective at inhibiting barium and strontium sulfate precipitation and scale formation.

SUMMARY OF THE INVENTION

It was found that in an acid regeneration operation, the acid was effective at removing barium, strontium, calcium and magnesium from the resin bed. However, as the acid mixed with alkaline produced water used to pre-flush the system the acid was neutralized in an interface zone and scale formation and precipitation became a problem.

The present inventor has discovered that polyepoxysuccinic acid (hereinafter PESA) is effective at inhibiting barium sulfate and strontium sulfate scale in low pH aqueous systems. PESA is an effective scale control agent at substoichiometric or threshold levels. In aqueous systems operating at low pH, that is a pH below about 4, PESA was found to be effective at controlling barium and strontium sulfate scales. It was discovered that PESA provided effective scale control in the pH range that exists in the interface zone between an acid resin regenerant and a produced water stream. In this interface zone, having a pH of from about 1 to 4 scale formation and precipitation was not effectively inhibited by phosphonates.

The method of the present invention comprises treating, with PESA, the acidic aqueous resin regeneration stream in a water softener regeneration system. The PESA has the general formula:

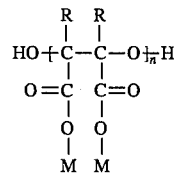

wherein n ranges from about 2 to 50, preferably 2 to 25, M is hydrogen or a water soluble cation such as $Na^+$, $NH_4^+$ or $K^+$ and R is hydrogen, $C_{1-4}$ alkyl or $C_{1-4}$ substituted alkyl. Preferably R is hydrogen. The use of PESA as a scale control agent in aqueous systems as well as a method of preparing PESA is set forth in U.S. Pat. Nos. 5,062,962 and 5,147,555 incorporated herein by reference.

In the present invention, the PESA is added to the acidic aqueous resin regeneration stream used to regenerate resin in a water softener system. The resin being regenerated is contaminated with hardness ions such as calcium, magnesium, barium and strontium from oil well produced water. The acidic resin regeneration stream has a pH below about 4 and typically below about 1. The PESA is added to the aqueous acidic regeneration stream in concentrations of from about 1 to 1000 parts per million and preferably about 10 to 100 parts per million. The preferred concentration of PESA will depend in part upon the concentration of scale forming materials which are removed from the resin by the resin regeneration stream.

The PESA scale control agent of the present invention may be employed as the sole scale control agent or in combination with other conventional treatments such as polymeric dispersants in the regenerant stream. Other scale control agents such as phosphates are typically present in the produced water stream in the system.

The present invention will now be further described with reference to a number of specific examples which are to be regarded solely as illustrative and not as restricting the scope of the present invention.

EXAMPLE I

Studies were undertaken to determine the relative efficacy of PESA and phosphonates for barium/strontium sulfate inhibition at low pH such as encountered during regeneration of a water softener resin in a produced water oilfield system. A solution containing 300 parts per million barium and 600 parts per million strontium was adjusted to pH 1.0 with hydrochloric acid. A solution containing 600 parts per million sulfate was adjusted to pH 1.0 with hydrochloric acid. 50 ml of the cation solution was dispensed into bottles and dosed with the inhibitor at a 1% active dilution preadjusted to pH 1.0 with hydrochloric acid. 50 ml of the sulfate solution was added and the solution allowed to equilibrate at room temperature overnight. The solutions were filtered and analyzed for barium and strontium by ICP (inductively coupled plasma spectroscopy). The mixed solution contained 150 parts per million barium, 300 parts per million strontium and 300 parts per million sulfate. A control was prepared with 50 ml of deionized water added to 50 ml of cation solution. A blank was also prepared which contained no treatment. The percent inhibition was calculated by the formula:

$$\frac{\text{parts per million barium (or strontium)} - \text{blank}}{(\text{control} - \text{blank})} \times 100$$

The phosphonate tested was diethylene triaminepenta(methylene phosphonic acid) available as Dequest 2060 (DQ-2060) from Monsanto Co., St. Louis, Mo. Table I summarizes the results.

TABLE I

| Inhibitor | PERCENT INHIBITION Treatment (ppm active) | | | | |
|---|---|---|---|---|---|
| | 5 | 10 | 50 | 100 | 200 |
| (BaSO$_4$) PESA | .7 | 1.8 | 10.5 | 19 | 32 |
| DQ-2060 | 0 | 0 | 0 | 0 | .3 |
| (SrSO$_4$) PESA | 14 | 16 | 41 | 52 | 60 |
| DQ-2060 | 0 | 0 | 2 | 0 | 0 |

The data in Table I shows that for both barium and strontium sulfate at the low pH condition tested, a prior art barium, strontium scale control agent (the phosphonate) was ineffective. The PESA of the present invention showed unexpected efficacy at inhibiting these scales at the test conditions.

EXAMPLE II

A field trial of the present invention was undertaken in a water softener of an operating oilfield produced water treatment facility. A resin bed softener was configured according to design specifications. The intermediate laterals were used for backwash and regeneration sequences. Prior to treatment the laterals would clog with barium, strontium and NORM scale (Naturally Occurring Radioactive Materials). Average flow through the softener prior to the trial was 19,371 bbls. After treatment with 200 ppm of a 25% active PESA feed to the backwash inlet, acid dilution water inlet and soft water line, average throughput increased to 19,501 bbls. The number of regenerations increased only 15.7% even though the average water flow increased 23.8%. Furthermore, scale deposits on the laterals was relatively non-existent. A subjective analysis determined approximately 90% reduction in deposits.

While the present invention has been described with respect to particular embodiments thereof, it is apparent that numerous other forms and modification of the invention will be obvious to those skilled in the art. The appended claims and this invention should be construed to cover all such obvious forms and modifications which are within the true spirit and scope of the present invention.

I claim:

1. A method of controlling the formation and deposition of barium and strontium scale forming salts in an aqueous water softening system resin regeneration stream interface zone having a pH of from about 1 to about 4, wherein acid regenerant is neutralized with oilfield produced water, comprising adding to said aqueous system a substoichiometric amount sufficient for the purpose of a treatment solution comprising polyepoxysuccinic acid.

2. The method of claim 1 wherein said polyepoxysuccinic acid is added to said aqueous system at active treatment levels ranging from about 1 to about 1000 parts per million.

3. A method of inhibiting the formation and deposition of barium sulfate and strontium sulfate in a water softening system acidic, aqueous resin regeneration stream, at a pH below about 4, wherein said aqueous resin regeneration stream is susceptible to barium sulfate and/or strontium sulfate precipitation comprising adding to said resin regeneration stream a substoichiometric amount sufficient for the purpose of a treatment solution comprising polyepoxysuccinic acid.

4. The method of claim 3 wherein said polyepoxysuccinic acid is added to said resin regeneration stream at active treatment levels ranging from about 1 to 1000 parts per million.

* * * * *